(12) United States Patent
Heschel et al.

(10) Patent No.: US 8,133,304 B2
(45) Date of Patent: Mar. 13, 2012

(54) PROCESS FOR THE PRODUCTION OF CARBONACEOUS ADSORPTION AGENTS DOPED WITH ELEMENTARY SULFUR AND A PROCESS FOR WASTE GAS CLEANING USING SUCH ADSORPTION AGENTS

(75) Inventors: Wolfgang Heschel, Freiberg (DE); Bernd Meyer, Freiberg (DE); Maik Werner, Goslar (DE); Jürgen Wirling, Hürth (DE)

(73) Assignee: RWE Power Aktiengesellschaft, Essen (DE)

( * ) Notice: Subject to any disclaimer, the term of this patent is extended or adjusted under 35 U.S.C. 154(b) by 536 days.

(21) Appl. No.: 12/110,634

(22) Filed: Apr. 28, 2008

(65) Prior Publication Data
US 2008/0289498 A1 Nov. 27, 2008

(30) Foreign Application Priority Data

Apr. 27, 2007 (DE) .......................... 10 2007 020 421

(51) Int. Cl.
*B01D 53/04* (2006.01)
(52) U.S. Cl. .......................................... 95/134; 502/416
(58) Field of Classification Search .................. 95/134; 502/416
See application file for complete search history.

(56) References Cited

U.S. PATENT DOCUMENTS

| 4,491,609 | A | | 1/1985 | Degel et al. |
| 4,500,327 | A | | 2/1985 | Nishino |
| 5,405,593 | A | * | 4/1995 | Knudson .................. 423/244.03 |
| 6,558,642 | B2 | * | 5/2003 | El-Shoubary et al. ..... 423/245.3 |
| 6,818,043 | B1 | * | 11/2004 | Chang et al. ...................... 95/37 |
| 2003/0153458 | A1 | * | 8/2003 | Trnetschek et al. ........... 502/432 |
| 2008/0176743 | A1 | * | 7/2008 | Heschel et al. ............... 502/423 |
| 2008/0274874 | A1 | * | 11/2008 | Heschel et al. .................. 502/60 |

FOREIGN PATENT DOCUMENTS

| DE | 3229396 | 2/1984 |
| DE | 4404997 | 8/1995 |
| DE | 19745191 | 4/1999 |
| EP | 0638351 | 2/1995 |
| GB | 2122916 | 1/1984 |
| WO | 9902243 | 1/1999 |

OTHER PUBLICATIONS

Karatza, "Study of mercury absorption and desorption on sulfur impregnated carbon," Experimental Thermal and Fluid Science 21 (2000) 150-155.

* cited by examiner

*Primary Examiner* — Robert J Hill, Jr.
*Assistant Examiner* — Christopher P Jones
(74) *Attorney, Agent, or Firm* — Grossman Tucker Perreault & Pfleger, PLLC

(57) ABSTRACT

The invention concerns a process for the production of carbonaceous adsorption agents doped with elementary sulfur, in which sulfur is mixed with the adsorption agent, the mixture is heated to a temperature of between 120° C. and 150° C. and the temperature is maintained over a period of about an hour. The process is distinguished in that heating of the mixture is effected under a controlled oxygen-bearing atmosphere. The invention further concerns a process for waste gas cleaning using carbonaceous absorption agents doped with elementary sulfur. Preferably brown coal coke is used as the adsorption agent.

9 Claims, No Drawings

PROCESS FOR THE PRODUCTION OF CARBONACEOUS ADSORPTION AGENTS DOPED WITH ELEMENTARY SULFUR AND A PROCESS FOR WASTE GAS CLEANING USING SUCH ADSORPTION AGENTS

The invention concerns a process for the production of carbonaceous adsorption agents doped with elementary sulfur, in which sulfur is mixed with the adsorption agent, the mixture is heated to a temperature of between 120° C. and 150° C. and the temperature is maintained over a period of between 0.5 and 1 hour.

Such a process is known for example from DE 32 29 396. DE 32 29 396 proposes mixing activated carbon of a grain size of about 3 mm with elementary sulfur and subjecting that mixture to post-treatment under the action of pressure and temperature. In that case the heat treatment takes place in a closed reaction chamber in such a way that the oxygen contained in the pore air of the adsorption agent reacts to give $CO_2$ and CO. In the open system, the pore air and the desorption gases $CO_2$ and CO escape. The conditioning processes described in DE 32 29 396 A1 represent a treatment in an inert gas atmosphere which is produced during the heat treatment itself. The sulfur is both physically adsorbed, that is to say deposited by capillary condensation of the vapor in the pores, and also chemisorbed. Chemisorption gives rise to carbon-sulfur complexes in which the sulfur is chemically fixedly bound and for example can no longer be removed by solvents.

The process disclosed in DE 32 29 396 produces a carbonaceous adsorption agent which is impregnated with elementary sulfur and which is excellently well suitable for the removal of harmful or even toxic substances from waste gases, in particular for the removal of mercury from waste gases. The adsorption agent is advantageously treated in such a way that elementary sulfur is present in an adsorbed condition exclusively on the internal surface of the adsorption agent, in which respect however the adsorption agent treated in accordance with DE 32 29 396 suffers from the disadvantage that it is not regeneratable, in the sense that the bound mercury can be liberated again without thermal decomposition of the carbonaceous adsorbents being necessary for that purpose.

Industrial processes are known in which waste gases with a mercury concentration are produced, which make recovery appear to be economic. For example in the recycling of mercury-bearing florescent tubes, mercury-bearing waste gases with a high level of mercury concentration are produced. In accordance with the practice hitherto the mercury-bearing adsorbents used in the waste gas cleaning operation are dumped. In addition those adsorbents are charged with comparatively little mercury and therefore give rise to comparatively high deposit disposal costs. The other known processes for recovery of the mercury from the adsorbents used are expensive in energy terms and are therefore not economically appropriate.

Therefore the object of the invention is to provide a process for the production of carbonaceous adsorbents doped with elementary sulfur, which can be regenerated again at a comparatively low level of complication and expenditure. In particular the invention seeks to provide that inexpensive recovery of the mercury contained in the adsorbents is possible.

That object is attained by a process of the kind set forth in the opening part of this specification, which is distinguished in that heating of the mixture is effected under a controlled oxygen-bearing atmosphere.

In that respect it has surprisingly been found that the surface oxides of the carbonaceous adsorption agents are maintained as a chemical equilibrium is produced between the concentration of oxygen in the gas atmosphere in the heat treatment of the adsorption agents and the concentration of surface oxides on the carbon surface. An adsorption agent impregnated with sulfur in that way has the advantageous property that the mercury contained in the waste gas does not involve a chemical compound with the sulfur so that mercury formation remains reversible. That can be explained by replacement of the oxygen in given surface oxides by sulfur. Particularly if, in the heat treatment of the mixture, a temperature of 150° C. is not exceeded, the advantageous action of the adsorption agent obtained in that way occurs.

Preferably the oxygen content in the gas atmosphere in the operation of mixing adsorption agent and sulfur is set to an amount of between 13 and 21% by volume. Particularly preferably the oxygen content is set to about 21% by volume, which corresponds to the oxygen content in the air. When carrying out the process, attention is to be paid to the oxygen content being kept in the set range so that no inertization of the atmosphere and self-heating of the mixture, resulting therefrom, occur.

Desirably the thermal treatment of the mixture is effected over a period of about one hour.

Preferably activated carbons and/or activated cokes are used as the carbonaceous adsorption agents.

In a particularly advantageous variant of the process according to the invention brown coal coke which was produced using the Salem-Lurgi hearth furnace process is used as the carbonaceous adsorption agent.

It is particularly advantageous if cokes which in the manufacture thereof were subjected to surface oxidation in a moist oxygen-bearing atmosphere are used as carbonaceous adsorption agents. The presence of surface oxides which are present even without such a treatment on the surface of the coke is prerequisite for the effectiveness according to the invention of the activated coke which is impregnated in accordance with the above-described process.

The invention further concerns a process for waste gas cleaning using carbonaceous adsorption agents doped with elementary sulfur, which were obtained in accordance with the above-described process, in which adsorption and desorption of mercury from the waste gas flow is effected alternately, preferably by means of a fixed bed adsorber. For that purpose for example a plurality of fixed bed adsorbers can be connected in succession. Alternatively it is possible to use a fixed bed adsorber which is in the form of a rotor adsorber.

Preferably the desorbate gas which is obtained in desorption of the mercury is cooled for the purposes of condensation and recovery of the mercury contained therein.

Preferably adsorption of the mercury is effected at a waste gas temperature of between 60° C. and 120° C., preferably at a waste gas temperature of between about 60° C. and 90° C.

Desorption of the mercury can be effected at a waste gas temperature of between 150° C. and 200° C., preferably at about 150° C.

In the case of the carbonaceous adsorption agents doped with elementary sulfur in accordance with the invention it has surprisingly been found that, after the thermal treatment of a sample which is carried out in an oxygen-bearing atmosphere, the sulfur is predominantly not involved in an irreversible chemical compound with the mercury, as a consequence of which mercury can be liberated again upon being heated to the treatment temperature or slightly thereabove.

Examples to clearly illustrate the mode of operation of a carbonaceous adsorption agent doped with elementary sulfur in accordance with the invention are described hereinafter, wherein Example 1 demonstrates the mode of operation of an activated carbon impregnated with sulfur in accordance with the state of the art, Example 2 in comparison therewith demonstrates the mode of operation of an adsorption agent doped in accordance with the process of the invention and Example 3 demonstrates the reusability of an adsorption agent doped in accordance with the invention after the one-off use thereof for waste gas cleaning.

EXAMPLE 1

Commercial activated carbon impregnated with at least 10 percent by mass of sulfur, bearing the trade mark name Desorex HGD 4 S (Donau Carbon GmbH Frankfurt/M) was charged with elementary mercury from a model gas flow under the following measurement conditions: Hg-entry concentration 980 µg/m$^3$; adsorption temperature 120° C.; desorption temperature 150° C.; vacuum gas speed 1.85 cm/s; carrier gas with 14% by volume of oxygen, 0.4% by volume of water vapor, and the balance nitrogen. The adsorption time was 19 hours. Desorption was effected with the Hg-bearing gas flow (crude gas desorption) over a period of 3.5 hours.

The sample which was comminuted to fine dust form, with a $d_{50}$ value of 20 µm, was fitted into the adsorber, in the form of 3 individual layers each of 0.5 g, separated by glass wool felts. The sandwich structure of the adsorption layer ensures a uniform flow through the sample in powder form. The Hg concentration after the adsorber was continuously measured.

After an adsorption duration of 19 hours the activated carbon had reached an Hg loading of 383 µg/g (0.0383 percent by mass).

After desorption over 3.5 hours at 150° C. the loading was 408 µg/g (0.04 percent by mass), that is to say even at the elevated temperature further adsorption of elementary mercury has occurred, as can be seen from the fact that the exit concentration at 600 µg/m$^3$ was below the entry concentration of 980 µg/m$^3$.

It is to be concluded from the result that, even at the elevated temperature, elementary mercury is still absorbed by the commercial activated carbon and consequently desorption is not possible at viable energy expenditure (desorption temperature).

EXAMPLE 2

Granular sulfur was comminuted in a disk ball mill to a $d_{50}$ value of 7 µm. 5 parts by weight of the sulfur dust were homogenously mixed with 95 parts by weight of brown coal coke dust (HOK Super, RWE Power AG, $d_{50}$ value 20 µm) in an overhead mixer. The sulfur content of the doped coke sample was 5 percent by mass. The coke sample was then exposed to a temperature of 150° C. over one hour, with a feed of air. The cooled sample was fitted into the adsorber in the form of 3 individual layers each of 0.5 g, separated by glass wool felts. The adsorption and desorption conditions exactly correspond to those of Example 1.

After an adsorption duration of 19 hours the sample according to the invention had reached an Hg loading of 153 µg/g (0.015 percent by mass).

After desorption over 3.5 hours at 150° C. the loading was 100 µg/g (0.01 percent by mass). During the desorption phase the Hg concentration in the desorption gas after the adsorber briefly rose to 3000 µg/m$^3$. On average an Hg concentration of 1750 µg/m$^3$ in the desorption gas was measured over the desorption period of 3.5 hours, which corresponds to an enrichment to 1.8 times, in relation to the entry concentration. The exit concentration fell with an increasing desorption time.

EXAMPLE 3

The desorbed coke sample of Example 2 was again charged with mercury and then desorbed a second time. The conditions were: Hg entry concentration 980 µg/m$^3$; adsorption temperature 60° C.; desorption temperature 150° C.; vacuum gas speed 1.56 cm/s; carrier gas with 14% by volume of oxygen, 0.4% by volume water vapor and the balance nitrogen. The adsorption time was 19 hours. Desorption was effected with the Hg-bearing gas flow (crude gas desorption) over a period of 3.5 hours.

After an adsorption duration of 19 hours the sample according to the invention had reached an Hg loading of 403 µg/g (0.04 percent by mass).

After desorption over 3.5 hours at 150° C. the loading was 250 µg/g (0.025 percent by mass). During the desorption phase the Hg concentration after the adsorber briefly rose to over 3000 µg/m$^3$. On average an Hg concentration of 2000 µg/m$^3$ in the desorption gas was measured over the desorption period of 3.5 hours, which corresponds to an enrichment to twice, in relation to the entry concentration. The exit concentration fell with an increasing desorption time. In the further cycles the loading fluctuated at 60° C. about a value of 400 µg/g. The desorbed Hg amount also remained constant at about 30% of the absorbed amount of Hg.

The result documents that about 30% of the amount of Hg is desorbed by a temperature increase to (only) 150° C. and with the Hg-bearing crude gas as the desorption medium (this is referred to as the loading margin).

The invention claimed is:

1. A process for the production of carbonaceous adsorption agents doped with elementary sulfur for reversible mercury adsorption, comprising providing a mixture of sulfur and solid adsorption agent consisting of solid sulfur mixed with the solid adsorption agent, heating the mixture to a temperature of between 120° C. and 150° C. and the temperature is maintained over a period of between 0.5 and 1 hour, wherein heating of the mixture is effected under a controlled oxygen-bearing atmosphere wherein the oxygen content is set between 13 and 21% by volume and kept in the set range wherein surface oxides formed on said carbonaceous agent during said heating are in chemical equilibrium with said oxygen, wherein said adsorption agent is further characterized in that absorbed mercury does not chemically compound with said elementary sulfur thereby providing said reversible mercury adsorption wherein said carbonaceous adsorption agent can repeatedly absorb mercury at a temperature of between 60° C. and 120° C. and liberate mercury at a temperature of between 150° C. and 200° C.

2. A process as set forth in claim 1 wherein said temperature of said mixture is maintained over a period of one hour.

3. A process as set forth in claim 1 wherein activated carbons and/or activated cokes are used as the carbonaceous adsorption agents.

4. A process as set forth in claim 1 wherein brown coal coke is used as the carbonaceous adsorption agent.

5. A process as set forth in claim 1 wherein cokes which in the manufacture thereof were subjected to surface oxidation in a moist oxygen-bearing atmosphere are used as carbonaceous adsorption agents.

6. A process for waste gas cleaning using carbonaceous adsorption agents doped with elementary sulfur comprising: providing said carbonaceous adsorption agents doped with elementary sulfur for reversible mercury adsorption, in which a mixture consisting of solid sulfur mixed with solid adsorption agent is provided, the mixture is heated to a temperature of between 120° C. and 150° C. and the temperature is maintained over a period of between 0.5 and 1 hour, wherein heating of the mixture is effected under a controlled oxygen-bearing atmosphere wherein the oxygen content is set between 13 and 21% by volume and kept in the set range throughout said period wherein surface oxides formed on said carbonaceous agent during said heating are in chemical equilibrium with said oxygen, wherein said adsorption agent is further characterized in that absorbed mercury does not chemically compound with said elementary sulfur thereby providing said reversible mercury adsorption wherein said carbonaceous adsorption agent can repeatedly absorb mercury at a temperature of between 60° C. and 120° C. and liberate mercury at a temperature of between 150° C. and 200° C., in which adsorption and desorption of mercury from the waste gas flow is effected alternately, by means of a fixed bed adsorber.

7. A process as set forth in claim 6 characterized in that the desorbate gas is cooled for the purposes of condensation of the mercury contained therein.

8. A process as set forth in claim 6 characterized in that adsorption of the mercury is effected at a waste gas temperature of between 60° C. and 120° C., preferably at a waste gas temperature of between 60° C. and 90° C.

9. A process as set forth in claim 6 characterized in that desorption of the mercury is effected at a waste gas temperature of between 150° C. and 200° C., preferably at about 150° C.

* * * * *